United States Patent
Yang et al.

(10) Patent No.: US 8,315,490 B1
(45) Date of Patent: Nov. 20, 2012

(54) PORT ARRAY TOPOLOGY FOR HIGH PORT COUNT WAVELENGTH SELECTIVE SWITCH

(75) Inventors: Long Yang, Union City, CA (US); Mark H. Garrett, Morgan Hill, CA (US); Jeffrey E. Ehrlich, San Jose, CA (US)

(73) Assignee: Capella Photonics, Inc., San Jose, CA (US)

( * ) Notice: Subject to any disclaimer, the term of this patent is extended or adjusted under 35 U.S.C. 154(b) by 235 days.

(21) Appl. No.: 12/821,086

(22) Filed: Jun. 22, 2010

(51) Int. Cl.
*G02B 6/26* (2006.01)

(52) U.S. Cl. ............................................ 385/17; 385/18
(58) Field of Classification Search .................... 385/17, 385/18
See application file for complete search history.

(56) References Cited

U.S. PATENT DOCUMENTS

| | | | |
|---|---|---|---|
| 6,253,001 B1 | 6/2001 | Hoen | |
| 6,549,699 B2 | 4/2003 | Belser et al. | |
| 6,625,346 B2 | 9/2003 | Wilde | |
| 6,661,948 B2 | 12/2003 | Wilde | |
| 6,687,431 B2 | 2/2004 | Chen et al. | |
| 6,760,511 B2 | 7/2004 | Garrett et al. | |
| 7,253,927 B2 | 8/2007 | Chien et al. | |
| 7,321,704 B2 * | 1/2008 | Ducellier et al. | 385/15 |
| 7,346,234 B2 * | 3/2008 | Davis et al. | 385/18 |
| 7,362,930 B2 | 4/2008 | Davis et al. | |
| 7,539,371 B2 * | 5/2009 | Martinelli et al. | 385/18 |
| 8,068,715 B2 * | 11/2011 | Kewitsch | 385/147 |
| 2005/0013003 A1 | 1/2005 | Marom | |
| 2005/0152429 A1 | 7/2005 | Scherer | |
| 2006/0140536 A1 * | 6/2006 | Aota et al. | 385/18 |
| 2006/0215954 A1 * | 9/2006 | Jenkins et al. | 385/18 |
| 2006/0228072 A1 | 10/2006 | Davis | |
| 2006/0245685 A1 | 11/2006 | Ducellier | |
| 2009/0232446 A1 | 9/2009 | Nagy et al. | |
| 2010/0061727 A1 | 3/2010 | Colbourne et al. | |

OTHER PUBLICATIONS

PCT International Search Report dated Oct. 14, 2011 for international application No. PCT/US2010/040974.

* cited by examiner

*Primary Examiner* — Charlie Peng
(74) *Attorney, Agent, or Firm* — Joshua D. Isenberg; JDI Patent (57) ABSTRACT

An optical apparatus can include an optical port array having an M×N array of fiber collimator ports. The array of ports is configured such that there is a gap within each column of ports located between two rows of ports. The gap is wide enough to permit a hitless beam switching trajectory to pass between the two rows of ports from one side of the array of ports to an opposite side.

17 Claims, 9 Drawing Sheets

PORT ARRAY TOPOLOGY FOR HIGH PORT COUNT WAVELENGTH SELECTIVE SWITCH

FIELD OF THE INVENTION

This invention generally relates of optical switch systems and more particularly to fiber collimator array or ports of the wavelength selective switch (WSS) to achieve the maximum port count with limited angle ranges of the beam deflecting elements.

BACKGROUND OF THE INVENTION

Multi-channel optical signals typically comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM).

Reconfigurable optical add-drop architectures are disclosed in commonly assigned U.S. Pat. Nos. 6,549,699, 6,625,346, 6,661,948, 6,687,431, and 6,760,511, the disclosures of which are incorporated by reference herein.

An optical switching node may comprise one or more wavelength selective switches (WSS) configured as ADD and/or DROP modules. The referenced patents disclose wavelength selective switch apparatus and methods comprising an array of fiber coupled collimators that serve as input and output ports for optical signals, a wavelength-separator such as a diffraction grating, a beam-focuser, and an array of channel beam deflecting elements, one beam deflecting element for each spectral channel. In operation, a composite multi-wavelength optical signal (also referred to herein as a "multi-channel optical signal") from an input port is supplied to the wavelength separator. The wavelength separator spatially separates or de-multiplexes the free-space multi-wavelength optical signal into an angular spectrum of constituent spectral channels, and the beam-focuser focuses the spectral channels onto corresponding ones of the channel beam deflecting element. By way of example, and not by way of limitation, the channel beam deflecting elements may be implemented in the form of micromirrors. The channel beam deflecting elements are positioned such that each channel beam deflecting element receives an assigned one of the separated spectral channel beams. The beam deflecting elements are individually controllable and continuously pivotal (or rotatable) so as to reflect the spectral channel beams into selected output ports. This enables each channel beam deflecting element to direct its corresponding spectral channel into any possible output port and thereby switch the spectral channel to any desired output port. Each output port may receive none, one, or more than one of the reflected and so directed spectral channels. Spectral channels may be selectively dropped from a multi-channel signal by switching the channels to different output ports, and new input channels may be selectively added or combined with the original channels to form different multi-wavelength composite signals.

It is also desirable, for a number of reasons, to be able to monitor and control the power in individual spectral channels of the multi-wavelength optical signal. This includes the ability to completely block the power contained in a particular spectral channel. One reason for controlling the power in a channel is to afford "hitless" switching to minimize undesired crosstalk during repositioning of a channel beam deflecting element to direct ("switch") an input spectral channel beam to a desired output port. During repositioning, the channel beam deflecting element redirects the input spectral channel beam across, i.e., "hits", intermediate ports, which couples unwanted light into the intermediate ports, and causes crosstalk. Thus, it is desirable either to completely block or to substantially attenuate the power in the beam during switching so that unwanted light coupling is avoided. Another use of monitoring and controlling the optical power of a channel is to afford attenuation of that channel to some predetermined level.

Figure 1:
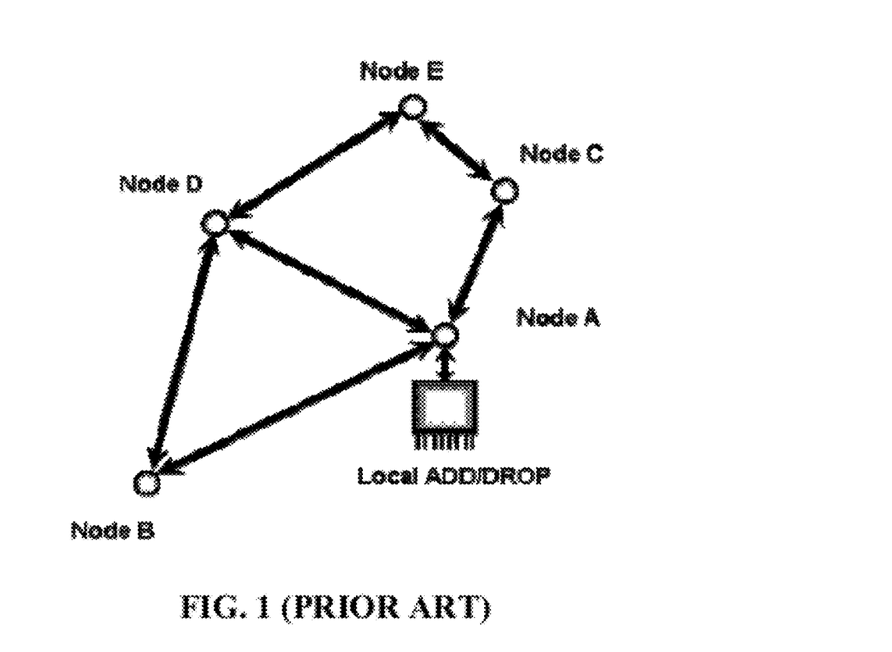
FIG. 1 is a high-degree node colorless ROADM with high port count of the prior art.

With the substantial growth of the demand for internet bandwidth, the internet traffic requirements have become quite unpredictable. In facing this challenge, the network has evolved to use ROADM (Reconfigurable Optical Add Drop Modules) at nodes in rings or mesh networks. These networks require dedicated wavelength selective switches (WSS). As shown in FIG. 1, the traffic from Point A to Point B can be routed dynamically. To enable routing flexibility, the system is likely to have many usable wavelengths or channels. When needed, a new channel is deployed in response to an increased bandwidth requirement of a particular node or is required from congestion/disruption of a part of the network. The evolution of WSS involves two basic architectures: Colored or Colorless. The former will switch a specific wavelength to its associated output fiber. The latter can switch a specific wavelength to any of the output fibers. The colored WSS typically uses AWG (Arrayed Waveguide Gratings) as the wavelength mux/demux element. The switching is performed between fibers or waveguides. The colored WSS is not flexible because fixed or specified wavelengths of the lasers are needed for the ADD module, even though tunable laser is widely available. The wavelength is fixed due to the physical association between the wavelength and the fiber. Once a fiber is connected to the laser, the wavelength is determined. Using the AWG based colored WSS the ROADM and thus the network is inflexible. It means the wavelength provision or routing is made when the lasers are installed, which is a manual operation.

The colorless WSS provides the freedom of choosing any wavelength dynamically, provided tunable lasers are connected to the ADD module. However, each tunable laser can only transmit data via one WDM channels. If more wavelengths are needed from a node, more tunable lasers will be needed to connect to the WSS. In this case, more WSS ports are needed. The more ports needed for the local add purpose, the fewer ports can be used between nodes. For this reason, it is desirable to have WSS with higher port counts.

However, there are many constraints to limit the number of ports in a WSS. The requirement hitless switching sets a topology challenge to the design of WSS. Currently, the port count of a free-space optical WSS is limited by the maximum angle that the micro-mirrors or light modulators can tilt. Micro-mirrors and light modulators are both considered a type beam deflecting element, (BDE). The allocation of angular range is determined by several factors. For instance, the packing density of the ports is limited by the number of resolvable spots. The latter is controlled by performance constraints on the port-to-port cross-talk, and hitless reconfiguration. Also, the waist of the optical beam at the BDE is usually smaller in one dimension to increase the passband width and this also reduces the number of resolvable spots in that dimension compared to the orthogonal direction. For those reasons, the WSS is typically designed with a 1×N configuration of ports at the input fiber collimator.

If the port count of WSS is greater than 25% of the number of wavelength channel, the network can be designed with good flexibility. If the number of port number of WSS is equal to the number of the wavelength channel, the network has a complete flexibility to drop all channels at one node and add all channels back. However, with the current state of art, the number of ports is typically about 10%. Therefore, it is desirable to increase the port count of WSS by 2 to 10 times.

It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

1. Description of Current Design Issues

Figure 2:
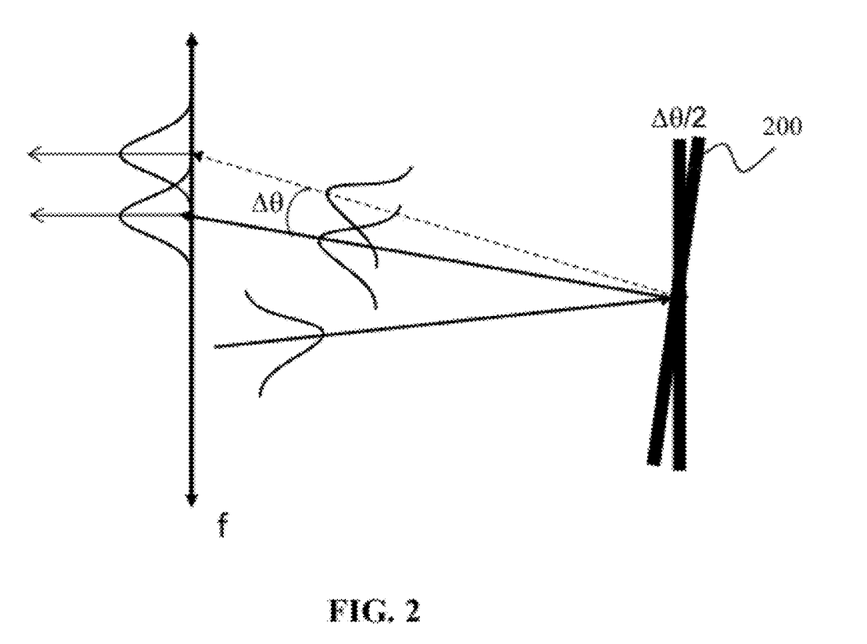
FIG. 2 is a diagram of lens focusing a Gaussian beam onto a rotatable mirror which can separate two like beams by an angle Δθ creating resolvable spots.

FIG. 2 is a simplified diagram of a WSS with a rotatable mirror 200, as a beam deflecting element (BDE), upon which is a Gaussian beam impinges indicated by the curves in the figure. As the mirror 200 rotates by an angle Δθ/2, the beam is deflected by an angle Δθ. The angular deflection of the beam results in a spatial displacement of the beam at some focal plane f. There is some minimum deflection angle $\Delta\theta_{min}$ required to produce an acceptable spatial separation of the deflected beam at the focal plane. As discussed below, the minimum deflection angle $\Delta\theta_{min}$ can be determined from the beam divergence $\theta_o$, which is related to the wavelength λ of light in the beam and the beam waist $\omega_o$ at the focal plane f as:

$$\theta_o = \frac{\lambda}{\pi \omega_o}$$

In addition, there is some maximum angular range of rotation of the mirror and therefore some maximum angular range for deflection of the beam. If the maximum angular range are known, the number of resolvable spots of the system can be determined by dividing and divided by the minimum angle. In the WSS, the "resolvable spots" impinge on a collimator to fiber array, each of which is a port of the WSS. Clearly, the greater the number of resolvable spots the higher the port count so the number of resolvable spots is a fundamental figure of merit for the WSS.

Since there are practical constraints to the total deflection angle there is a limit to the number of resolvable spots or total number of ports. So, to achieve the maximum number of ports the packing density must be optimized. In embodiments of the present invention a proposed new topology for the ports addresses these limitations and improves the packing density of ports based on performance constraints of the components and specifications of the WSS. These constraints include: 1) deflection limitations of the BDE, 2) spot size requirements for maximizing the passband of the WSS, 3) port-to-port cross-talk specifications of the WSS, and 4) hitless reconfiguration requirements of the WSS.

2. Deflection Limitations of the BDE

Figure 3:
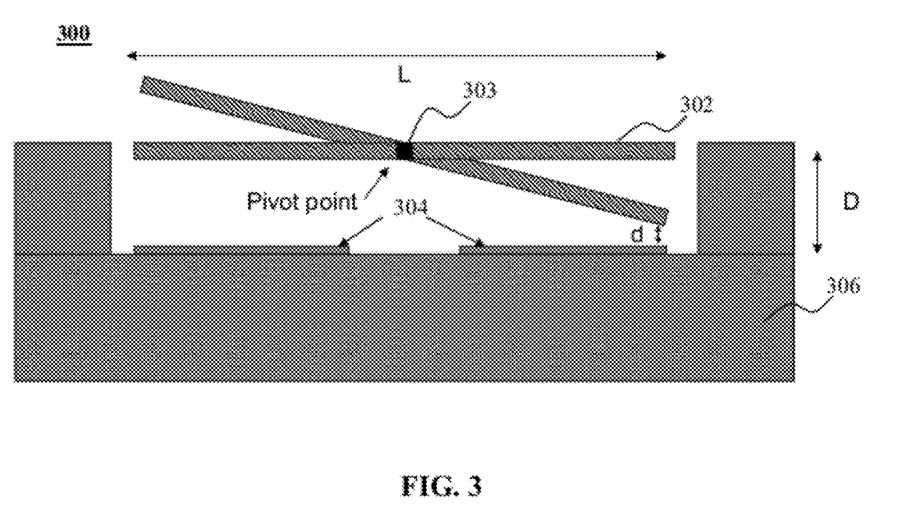
FIG. 3 is an example of the cross section of a MEMS micro-mirror of a type that can be used in embodiments of the present invention.

FIG. 3 is an end view of a MEMS micro-mirror element 300 given as an example of the BDE. Other possibilities for BDE include but are not limited to LCOS (liquid crystal on silicon) or LCA (liquid crystal array.) These BDE's have their own deflection limitations governed by their operating principles. In this example, the mirror element includes a mirror of length L that is mounted to a gimbaled frame 306 by a torsion beam 303. In order to tilt the mirror 302, one edge of the mirror has to move down by a limited amount set by the electrostatic actuator. For example, when different voltages are applied to electrodes 304 located underneath the mirror 302, electrostatic force causes the mirror 302 to move until the spring force from the torsion beam 303 completely counteracts the electrostatic force. The spring force increases linearly with the tilting angle. With an electrostatic actuator, the force is proportional to the square of the electric field. The larger the initial gap D the higher voltage is required to move the mirror 302. When the mirror tilts, the gap d between the mirror and the electrodes 304 becomes smaller and the force increases. When the electrostatic force cannot be counteracted by the spring force the mirror will snap down and contact the electrode. To avoid snap down one typically limits the maximum movement to about 44% of the initial gap.

Therefore, the maximum angle the mirror can turn can be approximated by, $$\theta_{max} = \tan^{-1}\left(\frac{44\% \, D}{L/2}\right) \approx 88\%\frac{D}{L} = 22\%\frac{D}{\omega_o} = \alpha\frac{V_{max}}{\omega_o}, \quad (1)$$

where $\alpha$ is determined by the structure of MEMS to achieve certain mechanical requirements, such as resonant frequency, available voltage, etc. Generally, for a larger value of D, a larger value of $V_{max}$ is required. L is the length of the mirror 302 and may arbitrarily be chosen to be 4 $\omega_o$ to cover >99% of the light energy impinging onto the mirror surface.

From Eq. (1) the number of resolvable spots, which is the ratio of the angular range of the BDE divided by the minimum angle, can be expressed as $$N_{rs} = \frac{\theta_{max}}{\theta_o} = \frac{\alpha\frac{V_{max}}{\omega_o}}{\frac{\lambda}{\pi\omega_o}} = \frac{\alpha\pi}{\lambda}V_{max} \quad (2)$$

The above analysis illustrates that the number of the resolvable spots is, in principle, limited only by the MEMS design, not the optical system because of the restriction between the size of the mirror and the tilt of the mirror. The number of resolvable spots can be regarded as an effective upper limit on the number of ports in one column of a port array used in a WSS. However, the above analysis does not including the practical consideration of the requirements of the so-called "hitless" switching.

3. Port-to-Port Cross-Talk and Hitless Reconfiguration Limits to The Number of Resolvable Spots (or Ports)

Figure 4:
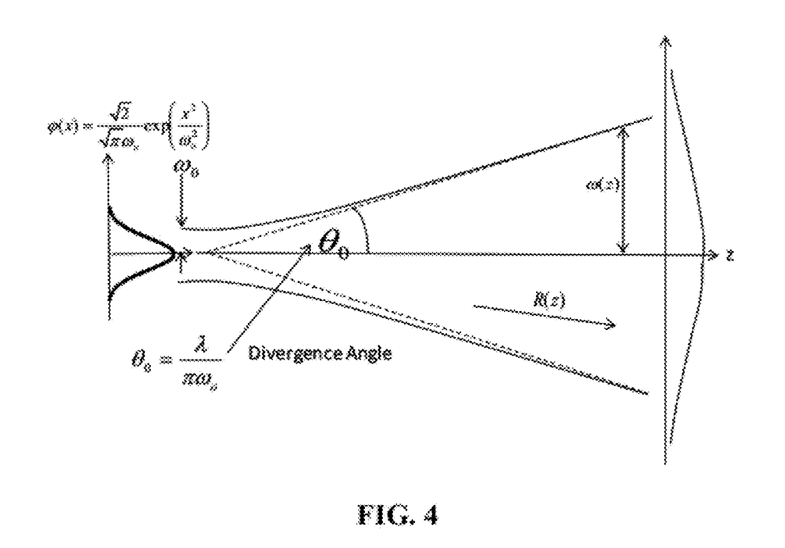
FIG. 4 is a diagram of the propagation of a Gaussian beam in free-space.

FIG. 4 shows an optical system where the waist ($\omega_o$) of a Gaussian beam $\phi(\chi)$ with divergence angle $\theta_o$ is at the beam deflecting element (BDE).

The light beam directed by the BDE must be angularly separated from other deflected beams, as shown in the FIG. 4, to an extent determined by the WSS performance requirements on adjacent port cross-talk and hitless reconfiguration. This is equivalent to determining the number of resolvable spots. To determine the allowable number of resolvable spots, the cross-talk between two deflected beams depends on the angular separation of the beams must be determined. The coupling efficiency $\eta$ between two such deflected Gaussian beams, which differ by an angle $\Delta\theta$, can be calculated from, $$\eta = \exp\left(-\frac{\Delta\theta^2}{\theta_o^2}\right), \quad (3)$$

where $\theta_o$ is the divergence angle of a Gaussian beam with waist $\omega_o$. It is quite typical to specify a maximum of −40 dB ($\eta=10^{-4}$) for the cross-talk between ports (or beams), and a value of −30 dB ($\eta=10^{-3}$) for the cross-talk for hitless reconfiguration. Using equation (3), the angle needed for <−40 dB cross talk is:

$$\exp\left(-\frac{\Delta\theta^2}{\theta_o^2}\right) \leq 10^{-4}, \Delta\theta \geq 3.03\theta_o \quad (4)$$

And, the angle needed for <−30 dB cross talk is:

$$\exp\left(-\frac{\Delta\theta^2}{\theta_o^2}\right) \leq 10^{-3}, \Delta\theta \geq 2.63\theta_o \quad (5)$$

Allowing for manufacturing tolerances one can use, e.g., $4\theta_o$ ($=\theta_{min}$) for port-to-port cross talk and $3\theta_o$ for hitless reconfiguration as examples of design rules. Those skilled in the art can design the system according to their actual requirements. The number of the resolvable spots (in this case constrained by the port cross-talk) is simply the ratio of the angle range of the BDE ($2\theta_{max}$) and the minimal allowed angle ($\Delta\theta=\theta_{min}$):

$$N_{rs} = 2\frac{2\theta_{max}}{4\theta_o} = \frac{\theta_{max}}{\theta_o} = \frac{\pi\omega_o\theta_{max}}{\lambda} \quad (6)$$

where $\theta_{max}$ is the maximum angle the mirror can turn in each direction. Note that an additional factor of 2 accounts for the angle of the steered beam, which is twice the rotation angle of the mirror. Eq. (6) illustrates the additional restriction of the resolvable spot imposed by the port to port cross talk. When the light beam is moving across the port array, it needs to satisfy the port-to-port cross talk and the hitless requirement simultaneously. This reduces the density of the port array 4. Spot Size Requirements for Maximizing the Passband of the WSS The passband of MEMS based free-space WSS is determined by the convolution of the spot size in the dispersion direction with the mirror width. The smaller the spot size or waist $\omega_o$ at the channel mirror the broader the passband. However, as previously noted a smaller waist $\omega_o$ also means a reduction in the number of resolvable spots.

Figure 5A:
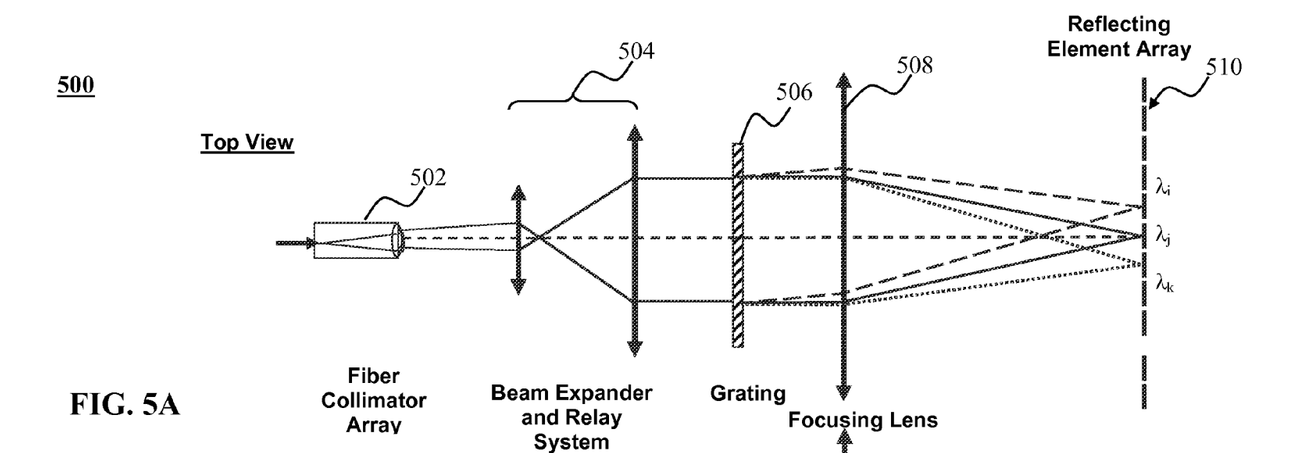
FIGS. 5A-5B are respectively, a top view and a side view of an example of a fiber to free-space Wavelength Selective Switch.
Figure 5B:
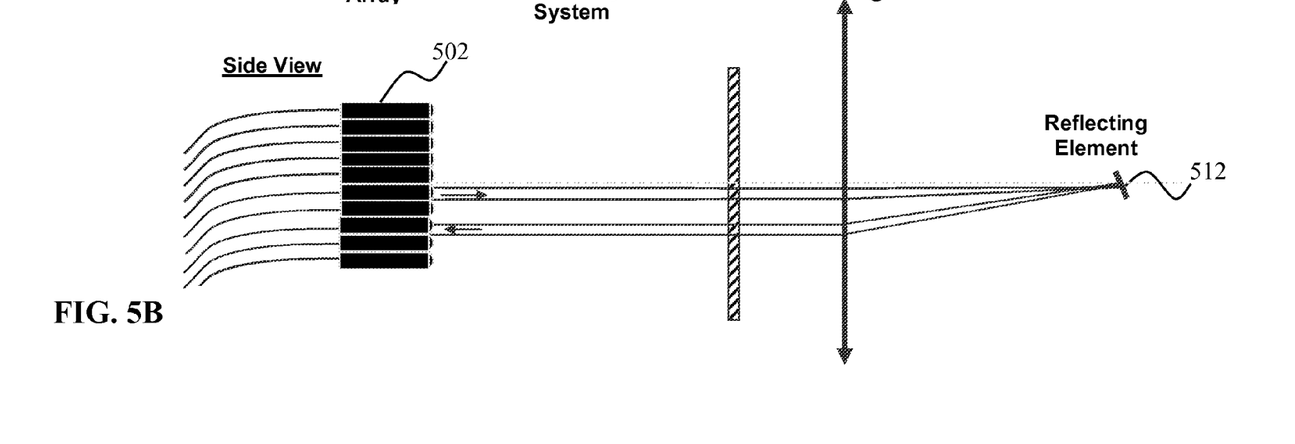

FIGS. 5A-5B are top and side views respectively of a simplified optical system or WSS 500 for one design of a free-space WSS that may be used in conjunction with embodiments of the present invention. Light is input and output to the WSS 500 through optical fibers. Light from one or more of the fibers is converted to a free-space beam by collimators (or ports) in a port array 502. The fiber collimator array 502 may comprise a plurality of individual fiber coupled collimators, one connected to each optical fiber as shown. An optical beam expander and relay system 504 expands the free space beams from the port array and optically couples them to a wavelength separator 506, e.g., a diffraction grating, which separates (or de-multiplexes) the free space beams into their constituent wavelengths or channels. By way of example and without limiting the scope of the invention, the wavelength separator 506 may be of any of several types of free-space beam separators are commercially available. Preferably, the wavelength separator 506 is a diffraction grating although embodiments of the invention are not limited to such gratings. Suitable types of diffraction gratings include but are not limited to reflection, such as high spatial frequency gratings holographically formed, low spatial frequency gratings such as an Echelle grating, which is a ruled grating, and transmission gratings which can be holographically formed in various polymers. Although a diffraction grating is preferred, other wavelength separators, e.g., planar light circuits, may alternatively be used instead of a diffraction grating as the wavelength separator 506.

Beam focusing optics 508 couple the spectral channels from the wavelength separator 506 to an array 510 of channel beam reflecting elements 512, optically arranged as illustrated in FIG. 5A. Each spectral channel of a given wavelength is focused on to a specific corresponding mirror in the array 510. By way of example, and not by way of limitation, three such spectral channels having center wavelengths denoted $\lambda_i$, $\lambda_j$ and $\lambda_k$ are shown in the FIG. 5A being focused onto different corresponding channel beam reflecting elements in the array 510.

After reflection from its corresponding channel beam reflecting element, each channel can be coupled back through the focusing optics 508, wavelength separate 506 and beam expander and relay optics 504 to the port array 502. The WSS 500 may optionally include a port mirror array (not shown) to facilitate coupling of optical beams between the wavelength separator and the ports in the port array 502. When a channel mirror in the array 510 tilts about its switching axis, the reflected spectral channel can along the port array 502 to selectively couple the spectral channel into a selected port in the array, as shown in the Side View of FIG. 5B.

Each port in the array 502 may receive any number of the reflected spectral channels from the beam reflecting element array 510. Accordingly, spectral channels may be selectively dropped from a composite multi-channel signal received at one of the ports (denoted an input port) by switching the channels to one or more "drop" output ports, and the multi-channel signal containing the remaining channels may be output from a "pass-through" port. Moreover, new input channels may be selectively added or combined at an output port with a subset of the original spectral channels to form a different multi-channel composite signal. Both WSS DROP modules that drop channels from and WSS ADD modules that insert or add channels to the multi-channel optical signal may employ a similar architecture to that shown in FIGS. 5A-5B, as will be described.

Figure 5C:
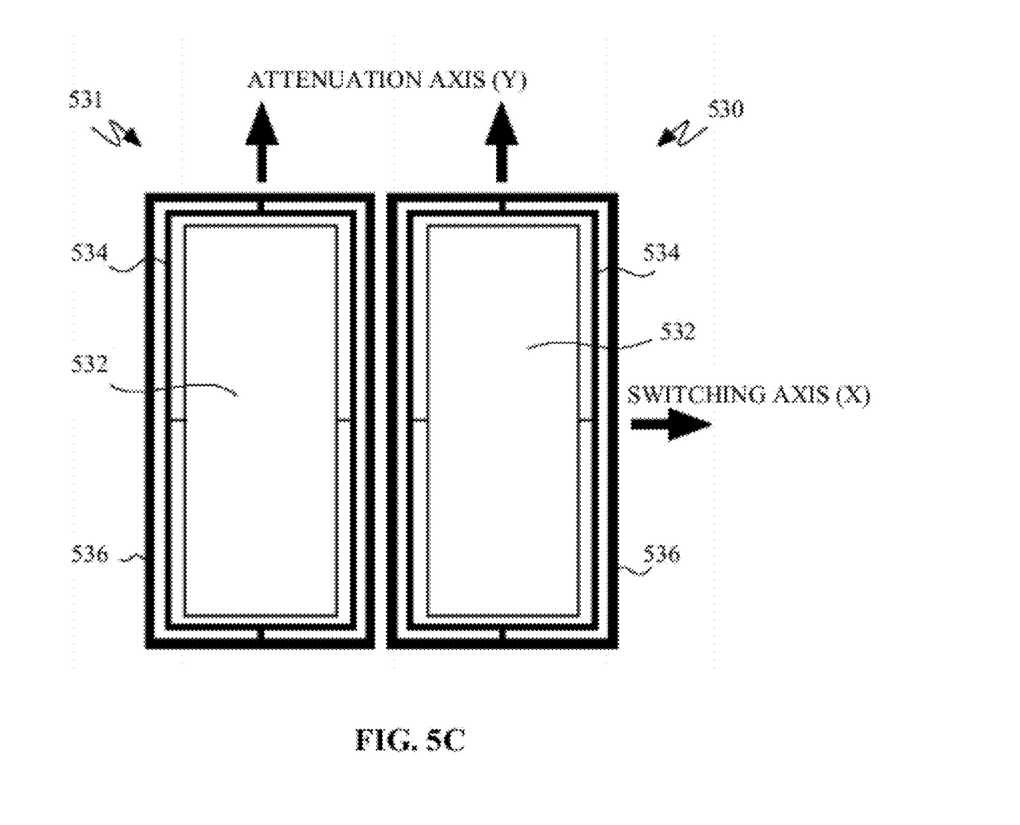
FIG. 5C illustrates a typical construction of a biaxial channel beam reflecting element in accordance with embodiments of the invention

Each micro-mirror in the array may be configured to tilt about axes either parallel to the array or perpendicular to the array. FIG. 5C illustrates a typical construction of a biaxial channel beam reflecting element in accordance with embodiments of the invention. The figure shows only a pair of adjacent biaxial MEMS channel beam reflecting elements 530, 531 of the plurality of beam reflecting elements of array 510. As suggested by the figure, the remaining beam reflecting elements of the array extend horizontally (in the figure) along the switching axis X with the same lateral spacing between beam reflecting elements. All beam reflecting elements of the array may have the same construction. Each channel beam reflecting element may compromise an assembly of a planar reflective surface 532 pivotally supported on an inner gimbaled frame 534 for rotation about a horizontal (in FIG. 5C) "switching" axis Y. Gimbaled frame 534 may be pivotally supported on an outer frame 536 for rotation about an orthogonal "attenuation" axis X. The pivoting movement of the reflective mirror surface 532 about the orthogonal axes may be continuously variable and actuated electrostatically by applying voltages to opposing pairs of control electrodes (not shown) in a well known manner.

As shown in FIG. 5C, the reflective mirror surface 532 of the channel beam reflecting elements may have an elongated, preferably rectangular, shape and be oriented with their narrow dimension, e.g., width, along the horizontal switching axis X (also known as the dispersion axis), and with their long dimension, e.g., length, along the vertical attenuation axis Y.

There are a number of reasons for this particular beam reflecting element profile and orientation relative to the orthogonal axes. This design affords optimum mechanical performance by affording beam reflecting elements of low mass, high resonant frequency, and low aerodynamic interaction, and optimizes optical performance such as high passband, and affords accurate control of attenuation, as will be explained. Referring back to FIG. 5A, the switching axis X of the channel beam reflecting elements of array 510 is parallel to the horizontal plane of FIG. 5A, while the attenuation axis Y extends perpendicular to the plane of FIG. 5A.

It is desirable that the profile of the spectral channel beams being focused onto the beam reflecting elements also be elongated and oriented to conform generally to the shape and size of the beam reflecting element. Moreover, it is desirable to control the spot size and location of a channel beam focused upon a corresponding beam reflecting element relative to the beam reflecting element size to minimize unwanted power loss and to maximize the passband.

To achieve a broad passband the optical beam optical beam expander and relay system 504 may expand the beam from the port array 502 anamorphically in the perpendicular dimension (dispersion axis) of grating lines in the wavelength separator 506, which results in a narrow beam waist when the light is focused onto the micro-mirror array. (Anamorphic expansion can also occur with gratings where the angle of incidence is much greater than the angle of reflection.) The beam expander and relay system 504 may comprise a series of lenses, e.g., bi-conical, cylindrical or toroidal lenses, or other optical elements to provide the system with anamorphic characteristics. Preferably, the beams have a generally elliptical shape, as shown in FIG. 6.

As noted above, when a channel mirror tilts along the attenuation axis (normal to the plane of the drawing), the reflected light will move left or right or off the collimators in the port array 502 thus attenuating the amount of the light coupled into the fibers. These movements are also illustrated in FIG. 6 which shows the frontal view of the collimator array 602 and associated beam movements for corresponding MEMS micro-mirror rotations.

Figure 6:
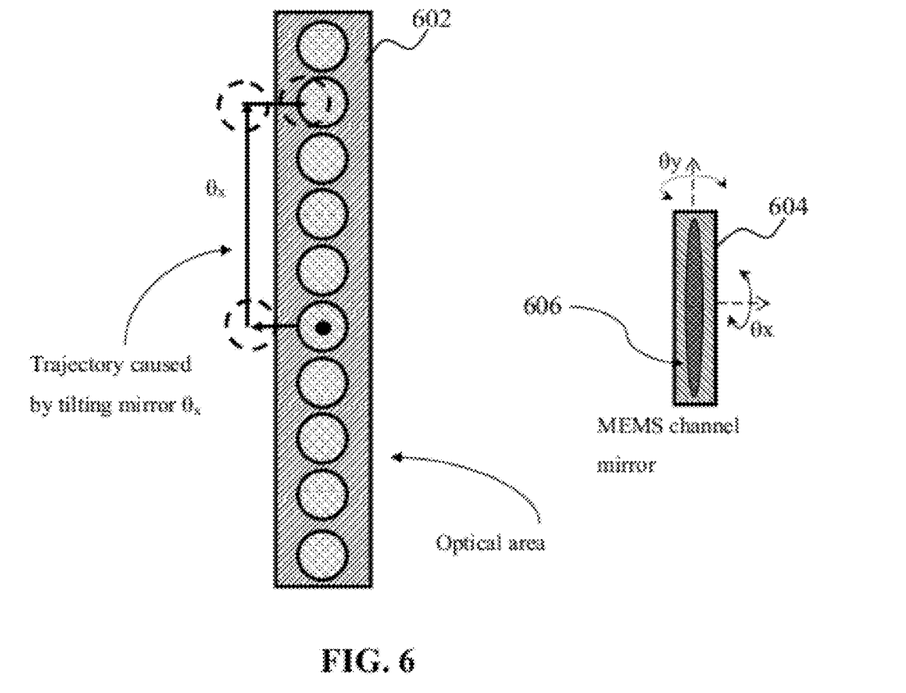
FIG. 6 is a diagram of the front view of the 1×N collimator or port array illustrating the corresponding movement of a reflected optical beam due to tilting of a micro-mirror in a free-space Wavelength Selective Switch.

The focused optical beam 606 at the mirror 604 is elliptical and the mirror shape is mostly rectangular with large aspect ratio as shown in FIG. 6. Due to the anamorphic character the WSS optics, and with similar angle ranges of the MEMS mirror in both axes, it is more effective to move the beam up and down the ports by rotation of a channel mirror about its switching axis than moving the beam left and right of a port by rotation of the channel mirror about its attenuation axis. Furthermore, as previously mentioned, additional angular range for rotation about the attenuation axis is utilized in the left-right movement for hitless reconfiguration of a spectral channel. For these reasons, the collimator array is typically arranged in a 1×N configuration, where N is greater than 1, but a M×N configuration, where M is greater than 1, is possible if the channel beam reflecting elements have sufficient angular range about both the switching and attenuation axes. However, this may be impractical since the large aspect ratio of the channel mirrors typically gives one rotation axes a larger angular range than the other.

Another important consideration to maximizing the number of ports is the optical design. Generally, the larger optical system, the more difficult to design and manufacture. Optical systems are often characterized by a property known as etendue, which characterizes how "spread out" the light is in area and angle. The optical aberration also goes up when the system etendue is increased. Therefore, it is also important to reduce the size of optics, e.g., in terms of the surface area of the relevant optics. In FIG. 6 the relevant surface area of the optics is illustrated as a rectangle of area A enclosing the collimator array. For hitless operation, the light does not need to be captured by the optics entirely (so clipping by the lenses is allowed). But, for all switching operations, the light has to be efficiently captured by the optics.

EMBODIMENTS

Figure 7A:
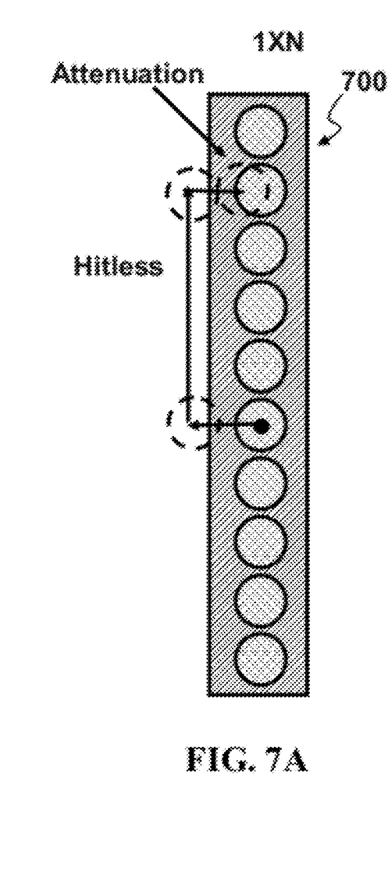
FIG. 7A is a front view diagram of a collimator or port array of the type depicted in FIG. 6.
Figure 7B:
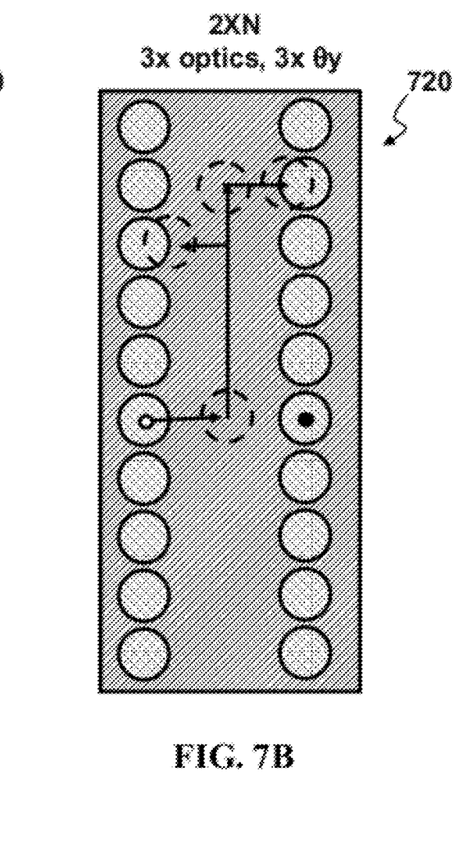
FIGS. 7B-7C are front views of alternative configurations of 2×N fiber collimator or port arrays for a free-space WSS.
Figure 7C:
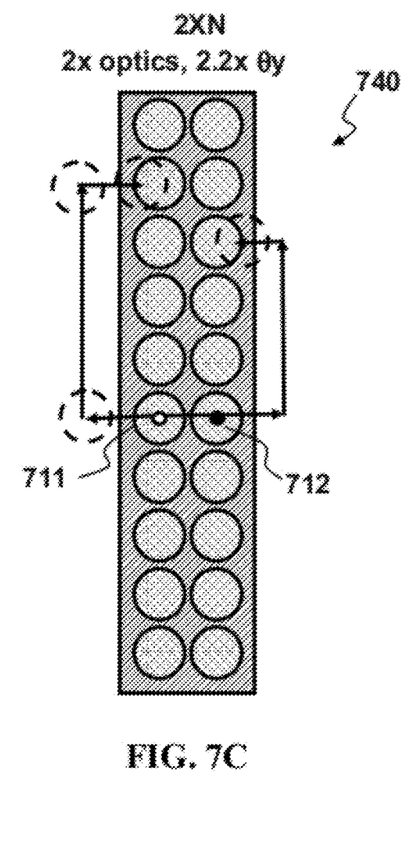

Given the aforementioned technical considerations the present invention prescribes a unique topology or arrangement of the fiber collimator array to maximize the packing density of the ports for a given angle range of the micro-mirrors with consideration to the number of resolvable spots allowed by performance constraints. The beams positions at the collimator array, as determined by the BDE, are shown in FIGS. 7A-7C. The dashed circle indicates the reflected optical beam. In a "Drop" configuration shown, the center collimator with a dot at the center is the input port for a multi-wavelength beam and the other circles represent collimators or ports where the beams carrying the spectral channels are directed for out-coupling. The lines with arrows indicate the trajectory of the beam due to the angular rotation of the MEMS micro-mirrors as the out-coupling of a given channel is reconfigured from one port to a different port.

FIG. 7A is similar to FIG. 6, which shows a hitless reconfiguration in a collimator array 700 having a 1×N arrangement of the collimators in the array. In FIG. 7A, the trajectory of the spectral channel reflected by a channel beam reflecting element illustrates that the beam goes to a hitless position before approaching the destined port. The port configuration shown in FIG. 7A places some requirement $\theta_y$ on the range of angular rotation of the beam reflecting element about the attenuation axis (Y-axis). FIG. 7A also shows that attenuation of the beam can be achieved by appropriately positioning the beam with respect to the collimator. Examples of extensions of the 1×N array of FIG. 7A in which a second 1×N array is added to the system are shown in FIG. 7B and FIG. 7C. In FIG. 7B, a port array 720 has a large gap between the two columns of ports to accommodate hitless switching. The width of the gap is approximately equal to the width of the 1×N array of FIG. 7A. Due to the gap, the port arrangement shown in FIG. 7B requires the area of the optics between the port array 502 and the channel beam reflecting element array 510 to increase by a factor of three to 3 A, where A is the area of the optics in a WSS that uses the port array in FIG. 7A. Assuming the length of the 2×N array (i.e., the number of rows N) is the same as for the 1×N array of FIG. 7A, the area of the optics can be increased to 3 A by tripling the width of the optics. In addition, the gap results in an increase in the required angular range of the channel beam reflecting elements with respect to the Y-axis to $3\theta_y$.

FIG. 7C, depicts a 2×N array 740 without a gap between the two columns of ports. The configuration of FIG. 7C is more favorable because it is more compact and thus requires a smaller range of angular rotation of the micro-mirror. Specifically, the 2×N port array of FIG. 7C requires doubling the area (or width) of the optics to 2 A and an increase in the angular range to $2.2\theta_y$, the additional angular range of $0.2\theta_y$ coming from the hitless requirement. Optical coupling of spectral channels to the ports can be reconfigured along hitless paths on either side of the 2×N array. However, these improvements come at the expense of a loss of one port 712 next to the input port 711 to allow the optical beam to cross over from one hitless path to the other.

Figure 8A:
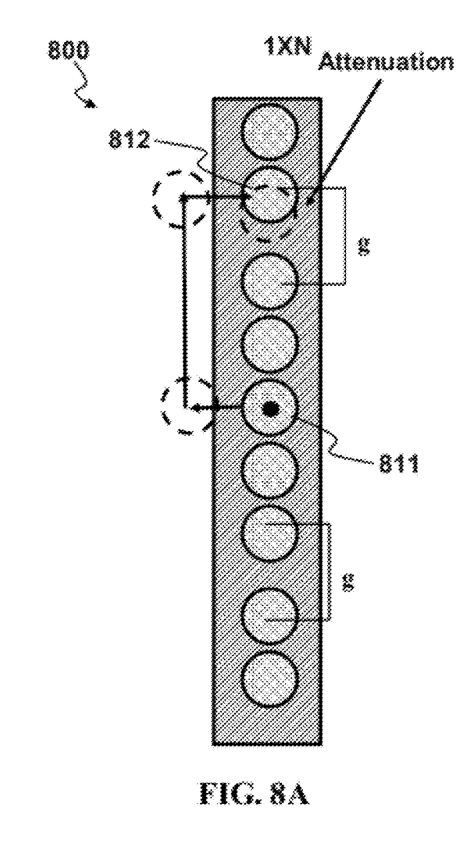
FIG. 8A is a front view of a 1×N collimator or port array with a new topology according to an embodiment of the present invention.
Figure 8B:
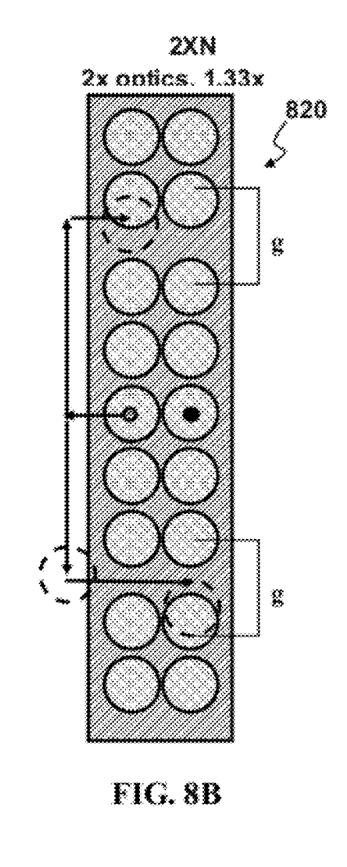
FIGS. 8B-8C are front views of the alternative 2×N collimator or port arrays with a new topology according to an embodiment of the present invention.
Figure 8C:
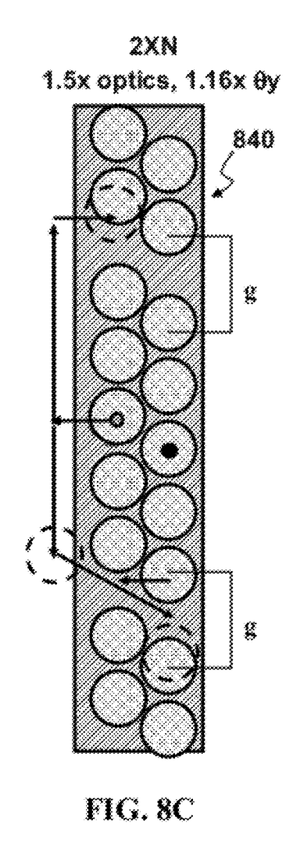

According to embodiments of the present invention, a new concept for the arrangement of a fiber collimator array in a wavelength selective switch reduces the requirements for the optics and the micro-mirrors is illustrated in FIGS. 8A-8C. The new concept is locating gaps between clusters of ports within a column of ports in a port array. These gaps allow hitless switching with only a small increase in the angular range $\theta_y$ relative to a 1×N configuration and thus enable M×N configurations, where M is 2 or greater. In fact, a port array configuration with strategically placed gaps between specified collimators, can increase the packaging density of ports, thereby increasing the number of ports of the switch. The requirement of hitless switching makes the optimum design quite different from the conventional wisdom as illustrated in FIGS. 7A-7C.

A shown in FIG. 8A, small gaps g can be introduced in a 1×N array so that the attenuation can be accomplished by the misalignment of the beam and the receiving collimator in the vertical direction (i.e., along the column of ports). By way of example, suppose that a channel beam reflecting element couples a spectral channel received at an input port 811 to a port 812 next to the gap g. The vertical misalignment can be accomplished through appropriate rotation of the channel beam reflecting element about its switching axis. The advantage of attenuating light by rotating the beam reflecting element about the switching axis is often desirable to achieve side lobe free passband during attenuation. Side lobe reduction by rotating a channel beam reflecting element about its switching during attenuation axis is described in detail in commonly-assigned U.S. Pat. Nos. 7,253,927, 7,362,930, 7,346,234, and 7,539,371, the entire contents of all of which are incorporated herein by reference. The density of the 1×N port array may be reduced by introducing the gap as a tradeoff for improved passband performance.

As a practical matter the smallest value of N (i.e., number of ports in a column) for which the gaps provide an advantage is 3, since a 1×2 array can be implemented without gaps.

In this example and the examples that follow, the gaps separate the last two ports at the ends of a column from the remaining ports in the column. However, other locations for the gap are possible and within the scope of embodiments of the present invention.

A counterintuitive result of introducing such gaps is that although the gap has a port density reducing effect in the 1×N array, it actually allows for an increase in the port density in a 2×N array (or M×N). This is because the hitless cross-talk can be accommodated by the vertical gap between ports within a column. As the result, although the area of the optics is increased to 2 A, the gaps within the columns in the port configuration shown in FIG. 8B eliminates the need for an access path between the columns as shown in FIG. 7B, thereby increasing the allowable packing density. The elimination of the need of the $2^{nd}$ access path shown in FIG. 7B reduces the required range of $\theta_y$ from $3\theta_y$ to $1.33\theta_y$. The configuration shown in FIG. 8B thus, reduces the required improvement in the angular range for MEMS mirror from a 200% improvement to a 33% improvement.

It is noted that in the examples illustrated herein, the gaps are shown separating the last two ports at the ends of each column from the rest of the ports. However, this should not be interpreted as a limitation upon any embodiment of the invention. In principle, the gaps can be located any where in the array. However, since a gap can be shared with adjacent ports (one move down, the other up), more space can be saved by having a gap for two rows. This way, the extreme row at either end of a column does not need a dedicated gap.

If the limitation of the MEMS angle is more stringent, one can further reduce its requirements by staggering the columns to increase the packing of the collimators as shown in FIG.

8C. The staggering of the columns can keep the center-to-center distance between ports the same as in the configuration shown in FIG. 8B, but the required lateral movement of the beam can be reduced by a factor of cos 30° if the staggered port columns are in a port packing configuration sometimes referred to as "hexagonal close packed". In order to maintain the low cross-talk during the switching, the gap between the clusters of fiber collimators should be increased by about 24%. While this may further reduce the density of ports in the columns, it increases the overall density of ports due to the reduced horizontal distance between the columns. The net port density increases slightly, e.g., by about 7%. This enables the 2×N configuration since less micro-mirror rotation is needed about the y axis and less optics area is required. By way of example, the staggered column 2×N port array shown in FIG. 8C can be configured such that the optics area is increased by only 1.5× and the required angular range for the beam reflecting elements is only $1.16\theta_y$.

It is noted that the gap allows attenuation of coupling to the ports on either side of the gap by rotation about the X-axis. The coupling to the ports at the ends of the columns can be attenuated in the same way.

Figure 9A:
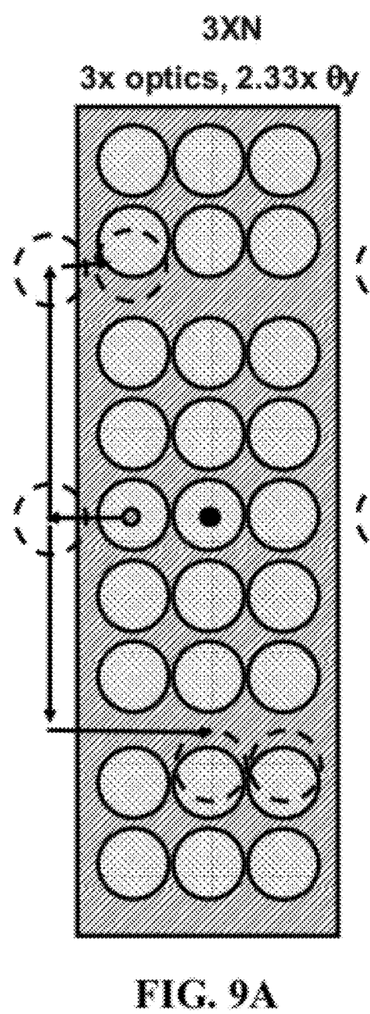
FIG. 9A is a front view of a collimator or port array having a 3×N port packing topology according to an embodiment of the present invention.
Figure 9B:
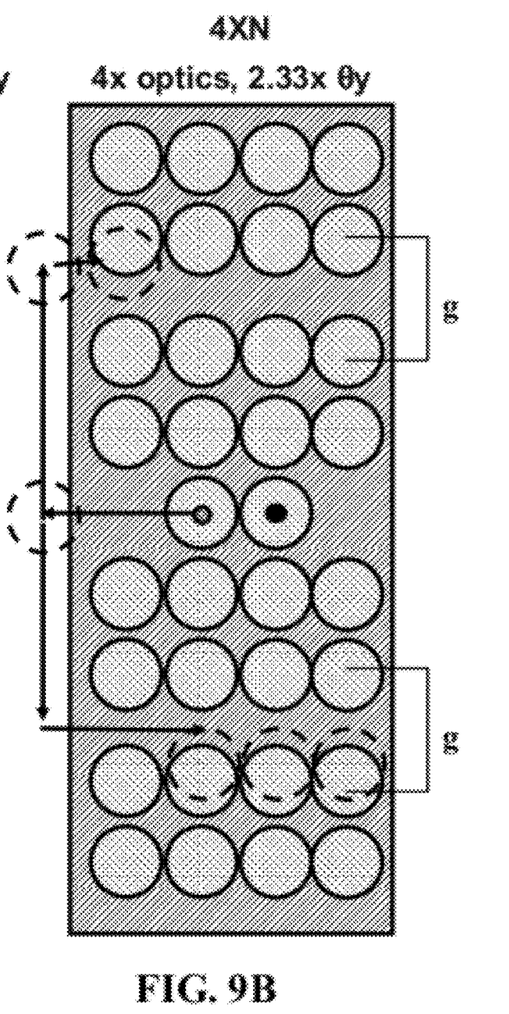
FIG. 9B is a front view of a collimator or port array having a 4×N port packing topology according to an embodiment of the present invention.

Embodiments of the invention in which gaps are located between clusters of fiber collimators in port arrays can be expanded to M×N port configurations. By way of example, and not by way of limitation, 3×N and 4×N port packing topologies are shown in FIGS. 9A-9B respectively. The 3×N configuration shown in FIG. 9A requires a 3× increase in the width of the optics and a 2.33× increase in the angular range $\theta_y$, compared to a 1×N configuration light that shown in FIG. 7A. The 4×N configuration shown in FIG. 9B requires a 4× increase in the width of the optics and a 2.33× increase in the angular range $\theta_y$, compared to a 1×N configuration. Note that the gap allows attenuation of ports on either side of the gaps to be accomplished by movement of a spectral channel in a direction more or less parallel to the columns, e.g., by rotating the relevant channel beam reflecting element about its X-axis (switching axis).

It is noted that in FIGS. 6, 7A-7C, 8A-8C, 9A, and 9B the ports with black dot or open circle can not be used as hitless ports. The light is fed to the port with black dot and is imaged to the one with open circle. Between these two ports is the optical axis.

Figure 10A:
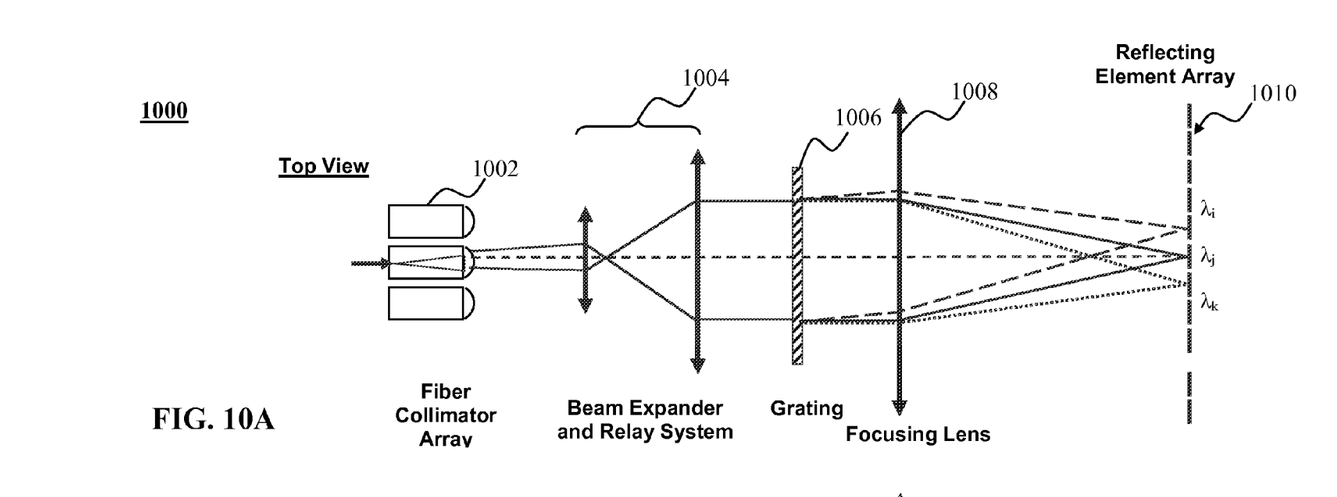
FIGS. 10A-10B are respectively a top view and a side view of an example of a fiber to free-space Wavelength Selective Switch according to embodiment of the present invention.
Figure 10B:
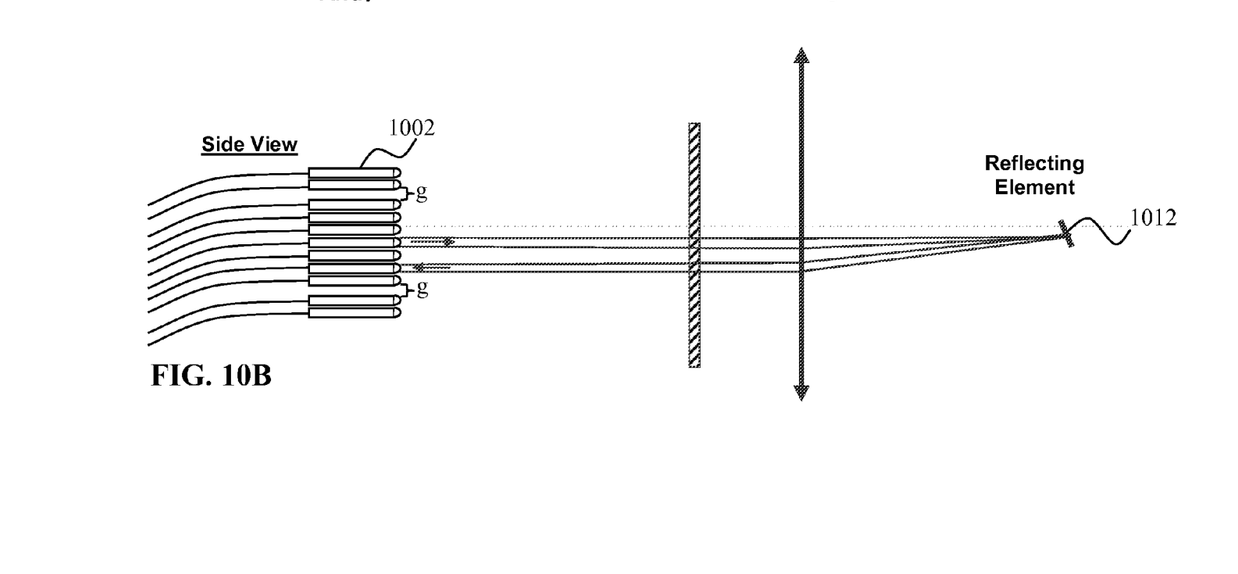

Port arrays of the types shown in FIGS. 8A, 8B, 8C, 9A, and 9B can be incorporated into wavelength selective switches of the type shown in FIGS. 5A-5B with relatively straightforward modification of existing switch designs. Specifically, as shown in FIGS. 10A-10B, a wavelength selective switch 1000 may include a port array 1002, beam expander and relay optics 1004, a wavelength separator 1006, focusing optics 1008, and a beam reflecting element array 1010 having a plurality of channel beam reflecting elements 1012. The port array 1002 may be configured as shown in FIGS. 8A, 8B, 8C, 9A, and 9B and described above. Specifically, as seen in FIG. 10B, the port array 1002 may include gaps g between clusters of ports as described above to accommodate hitless switching. The beam expander and relay optics 1004, wavelength separator 1006, focusing optics 1008 and beam reflecting element array 1010 may be configured largely as described above with respect to FIGS. 5A-5B. To accommodate an M×N port array, where M is greater than 1, the beam expander and relay optics 1004, wavelength separator 1006, and focusing optics 1008 may be wider by a factor of M compared to the corresponding components in FIG. 5A.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. An optical apparatus for switching multi-channel optical signals having spectral channels of different wavelengths, comprising:

an M×N array of ports for optical signals having one or more of said spectral channels, wherein M is a number of columns and N is a number of rows of the array;

a wavelength separator optically coupled to the array of ports, wherein the wavelength separator is configured to spatially separate a spectral beam from one of the ports in the array into one or more constituent spectral channels;

an array of channel beam deflecting elements optically coupled to the wavelength separator, the array of channel beam deflecting elements including a plurality of channel beam deflecting elements, wherein each channel beam deflecting element is positioned to receive a corresponding one of the constituent spectral channels, wherein each beam deflecting elements is configured to tilt about two non-parallel axes to move the corresponding spectral channel across the port array; and wherein array of ports is configured such that there is a gap within each column of ports located between two rows of ports, wherein the gap is wide enough to permit a hitless beam switching trajectory to pass between the two rows of ports from one side of the array of ports to an opposite side, wherein the array of ports is configured such that each column contains four or more adjacent rows without a gap wide enough to permit a hitless beam switching trajectory to pass between two rows of the four or more adjacent rows.

2. The optical apparatus of claim 1 wherein M is greater than 1 and there is no gap between two adjacent columns that is wide enough to permit a hitless beam switching trajectory to pass between the two adjacent columns.

3. The optical apparatus of claim 2 wherein two or more columns are staggered with respect to each other.

4. The optical apparatus of claim 3 wherein the one or more columns are staggered in a hexagonal close packed configuration.

5. The optical apparatus of claim 2 wherein a width of optical components between the array of ports and the array of channel beam deflecting elements is not greater than about M times greater than a width of optical components in a similarly configured apparatus having a 1×N array of ports.

6. The optical apparatus of claim 2 wherein the columns of ports in the port array are spaced apart such that a requirement of an angular range of rotation of each channel mircomirror about its second axis is less than M times greater than a required angular range $\theta_y$ of each channel beam deflecting element about its second axis in a similarly configured apparatus having a 1×N array of ports.

7. The optical apparatus of claim 2 wherein M=2 and the angular range of rotation of each channel mircomirror about its second axis is not greater than about $1.33\ \theta_y$.

8. The optical apparatus of claim 2 wherein M=2 and the angular range of rotation of each channel mircomirror about its second axis is not greater than about 1.16 $\theta_y$.

9. The optical apparatus of claim 2 wherein M=3 or M=4 and the angular range of rotation of each channel mircomirror about its second axis is not greater than about 2.33 $\theta_y$.

10. The optical apparatus of claim 1 wherein the gap separates the last two ports in a column from the remaining ports in the column.

11. The optical apparatus of claim 1 wherein N is greater than or equal to 5.

12. An optical port array for a wavelength selective switch, comprising: an M×N array of fiber collimator ports, wherein M is a number of columns and N is a number of rows of the array
wherein the array of ports is configured such that there is a gap within each column of ports located between two rows of ports, wherein the gap is wide enough to permit a hitless beam switching trajectory to pass between the two rows of ports from one side of the array of ports to an opposite side, wherein the array of ports is configured such that each column contains four or more adjacent rows without a gap wide enough to permit a hitless beam switching trajectory to pass between two rows of the four or more adjacent rows.

13. The optical port array of claim 12 wherein M is greater than 1 and there is no gap between two adjacent columns that is wide enough to permit a hitless beam switching trajectory to pass between the two adjacent columns.

14. The optical port array of claim 13 wherein two or more columns are staggered with respect to each other.

15. The optical port array of claim 14 wherein the one or more columns are staggered in a hexagonal close packed configuration.

16. The optical port array of claim 12 wherein the gap separates the last two ports in a column from the remaining ports in the column.

17. The optical port array of claim 12 wherein N is greater than or equal to 5.

* * * * *